July 28, 1970        H. F. KELDERMAN        3,521,943
APPARATUS FOR GENERATING ASPHERIC REFLECTING SURFACES USEFUL
FOR CORRECTING SPHERICAL ABERRATION
Filed Sept. 30, 1966        4 Sheets-Sheet 1

INVENTOR.
HERMAN F. KELDERMAN
BY
Christie, Parker & Hale
ATTORNEYS.

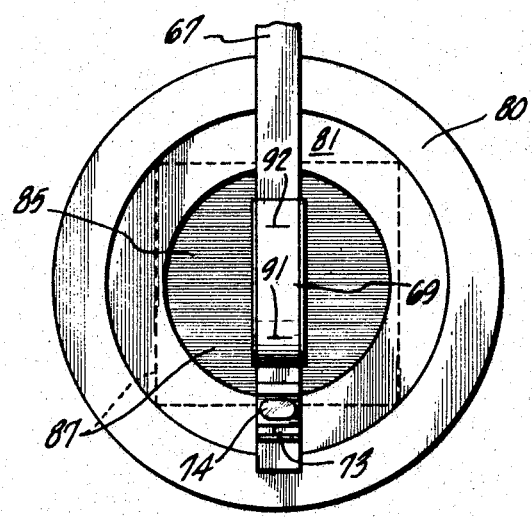
FIG_8_
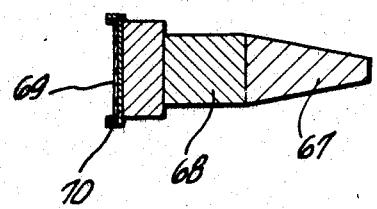
FIG_9_
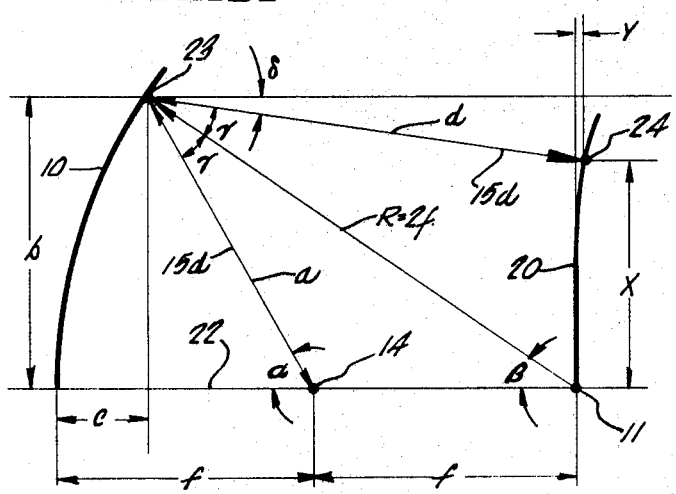
FIG_4A_
INVENTOR.
HERMAN F. KELDERMAN
BY
Christie, Parker & Hale
ATTORNEYS.

July 28, 1970     H. F. KELDERMAN     3,521,943
APPARATUS FOR GENERATING ASPHERIC REFLECTING SURFACES USEFUL
FOR CORRECTING SPHERICAL ABERRATION
Filed Sept. 30, 1966     4 Sheets-Sheet 3

INVENTOR.
HERMAN F. KELDERMAN
BY
Christie Parker & Hale
ATTORNEYS.

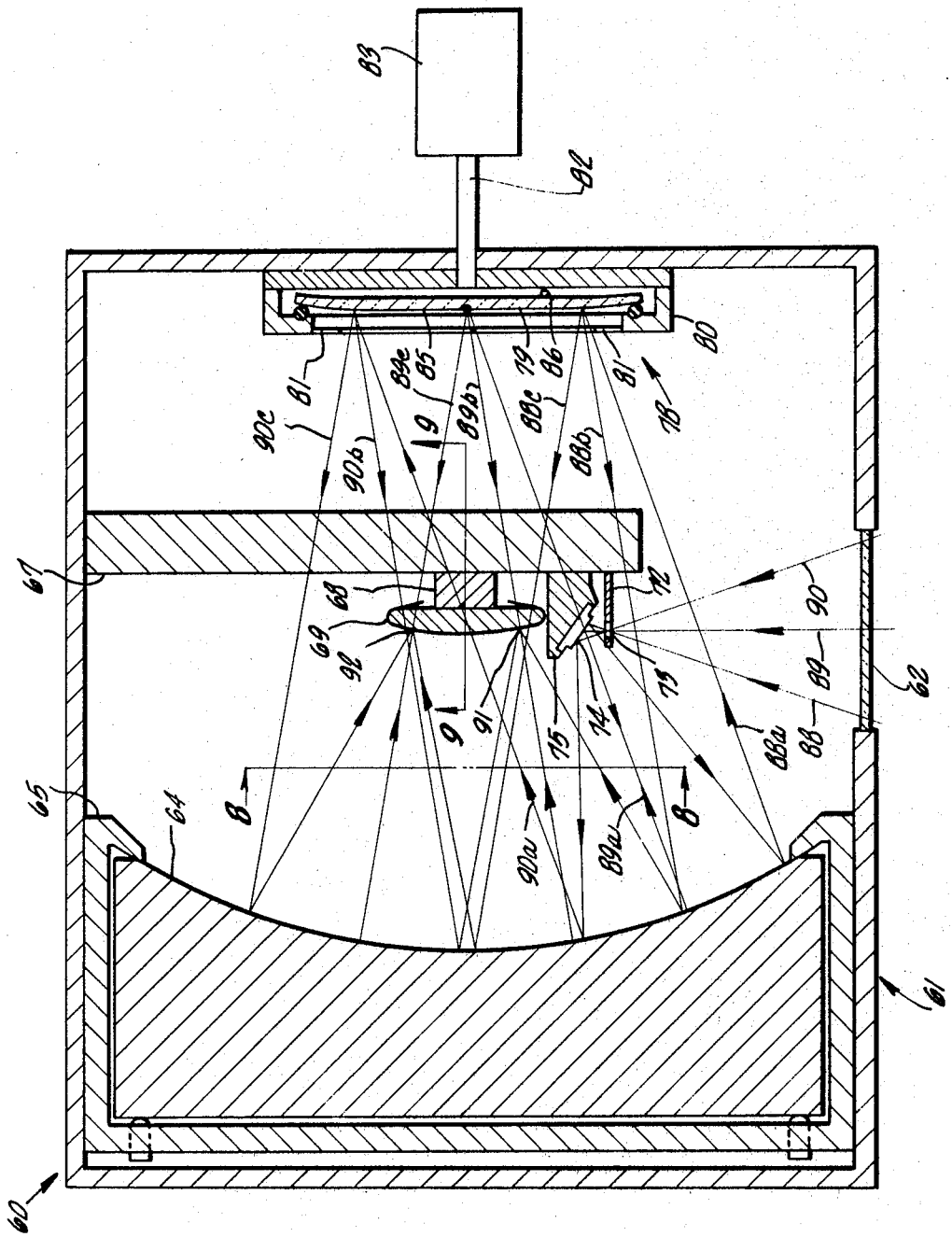

United States Patent Office 3,521,943
Patented July 28, 1970

---

3,521,943
APPARATUS FOR GENERATING ASPHERIC REFLECTING SURFACES USEFUL FOR CORRECTING SPHERICAL ABERRATION
Herman F. Kelderman, 890 S. Rosemead Blvd., Pasadena, Calif. 91107
Filed Sept. 30, 1966, Ser. No. 583,397
Int. Cl. G02b 5/18, 17/00
U.S. Cl. 350—162                                    12 Claims

ABSTRACT OF THE DISCLOSURE

A flexible member having a spherical reflecting surface when the member is unstressed. The surface is converted to an aspheric reflector by mounting the member free of radial or edge constraints and imposing a differential pressure across opposite faces of the member. Aspheric reflecting surfaces generated by this technique find particular utility in the correction of spherical aberration introduced in optical systems having a spherical mirror with a finite radius of curvature. A diffraction grating can be formed on the surface of the aspheric correcting mirror, and a spectrograph using this form of the invention is described.

BACKGROUND OF THE INVENTION

This invention relates to the field of optical apparatus, and specifically to a novel method and apparatus for generating and figuring aspheric optical reflecting surfaces or mirrors. The invention extends to the use of such surfaces in optical instruments, and includes the use of a pressurized aspheric reflecting diffraction grating in a spectrograph.

Commonly encountered mirrors have a spherically curved reflecting surface which is relatively easy and inexpensive to grind. The general class of spherical surfaces includes flat surfaces which are simply the special case of a spherical surface having an infinite radius of curvature. A mirror redirects the propagation of all wavelengths equally, and a mirror-formed image is therefore free of chromatic aberrations. However, images formed by spherical mirrors of finite radius of curvature are affected by several types of monochromatic aberrations.

For example, as the relative or numeric aperture of a spherical mirror is increased, spherical aberration (the imperfect union at a common focal point of paraxial and marginal light rays) becomes increasingly severe. Similarly, as the angular field of the mirror is widened, the aberrations of coma, astigmatism, field curvature and distortion generally become appreciable. Of these aberrations, coma, astigmatism and distortion can be eliminated by the proper location of an aperture stop positioned in the optical path of the reflector.

Spherical aberration can be minimized by incorporating correcting lenses in the system, the lenses preferably being located or imaged at or around the mirror center of curvature. The correcting lenses may be spherical as in the Bouwers-Maksutov system, or may be aspheric as in the well-known Kellner-Schmidt optical systems. Lenses, however, are refracting elements which introduce chromatic aberrations. Furthermore, lenses have poor transmission characteristics in the deep ultraviolet range, and are therefore unusable in many spectroscopic instruments.

Another approach to the control of spherical aberration is the use of reflecting surfaces which depart from a purely spherical curvature. A familiar application of aspheric surfaces is in reflecting telescopes using parabolically contoured mirrors which are free of spherical aberration. Aspheric mirrors may also be used to correct spherical aberration introduced by a spherical mirror elsewhere in the system. However, aspheric-mirror surfaces have in the past been produced by arduous hand grinding and figuring performed by highly skilled workers. The resulting mirror is very costly, and optical systems of this type have therefore had limited use.

I have developed an economical method and apparatus for generating precision aspheric-mirror surfaces at a cost much lower than that of conventional grinding techniques. My invention involves the use of a member having an initially formed spherical reflecting surface which is deformed by loading into a predictable, repeatable aspheric reflecting surface. Depending on the manner in which the member is supported, and the nature of the loading, different surface curvatures may be produced in accordance with the theory of elasticity relating to deformation of beams, plates, shells, and the like.

For example, a simply supported linear beam which is subjected to point loading will deflect to produce a second-degree parabolic curvature. If the loading is evenly distributed along the beam, the resulting curvature will be in the form of a third-degree parabola. The deflected surface which results from a particular method of loading a specific type of elastic structure can be determined by reference to a standard text on the theory of elasticity such as "Theory of Plates and Shells" by Timoshenko.

In an especially useful form of the invention, a flexible disc having a polished or coated reflecting front surface is uniformly supported about its periphery. Point loading of the rear surface of the disc produces a third-degree reflecting surface, and uniform loading produces a fourth-degree reflector. Uniform loading is readily accomplished by establishing a differential pressure between the front and rear surfaces of the disc, and the resulting aspheric mirror is well adapted to correction of spherical aberration.

The reflecting surface of the pressurized disc can also include rulings to define a diffraction grating. Incident radiation is both reflected and dispersed by the resulting aspheric reflecting grating. This form of the invention is highly suited for use in instruments such as spectrographs, and permits economical manufacture of high-speed, high-resolution emission spectrometers and the like.

SUMMARY OF THE INVENTION

Briefly stated, the aspheric mirror of this invention comprises a non-membranous self-supporting flexible member having a spherical reflecting surface when the member is unstressed. Mounting means associated with the member position the member so it can be deflected free of edge constraints, and to receive light from a light source and reflect the light toward a target surface in an instrument. Deflecting means associated with the housing apply and maintain a force on the member whereby the member is deflected and the reflecting surface becomes aspheric. The member is deformable by the deflecting means to define a reflector shaped substantially as a fourth-degree rotation paraboloid with an infinite vertex radius of curvature to correct spherical aberration in an optical system.

Preferably, the deflecting means includes means for maintaining a differential pressure between the two sides of the member to provide uniform loading. In one form of the invention, a diffraction grating is ruled on the reflecting surface of the member to provide an aspheric reflecting diffraction grating when the member is loaded.

BRIEF DESCRIPTION OF THE DRAWINGS

FIG. 1A is a diagram similar to FIG. 1 showing the path of a single light ray;

FIG. 7 is a side elevation, partly in section, of a spectrograph including an aspheric reflecting diffraction grating according to the invention;

FIG. 8 is a view along line 8—8 of FIG. 7; and

FIG. 9 is a view along line 9—9 of FIG. 7.

DESCRIPTION OF THE PREFERRED EMBODIMENTS

Figure 1:
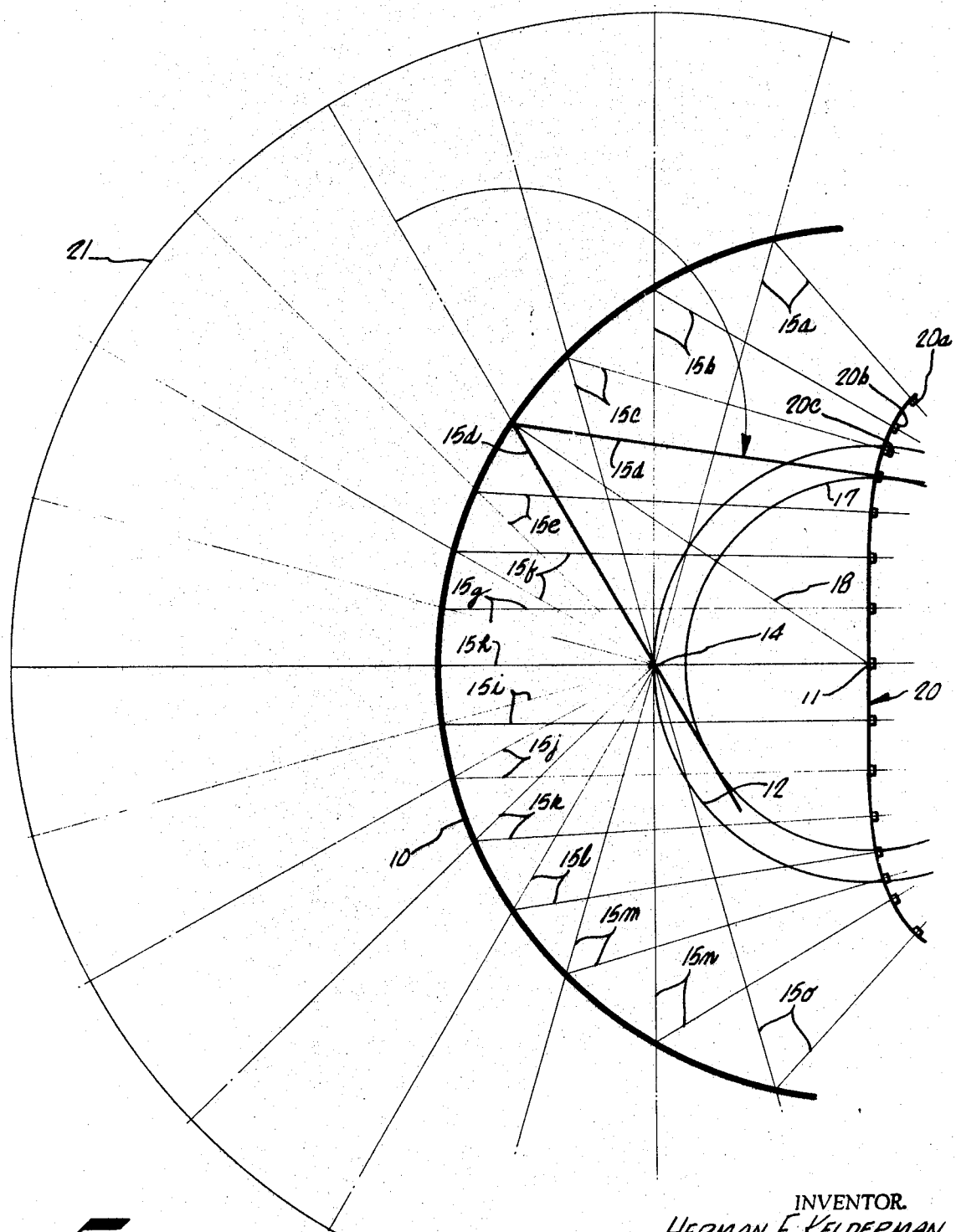
FIG. 1 is a diagram showing the geometric construction of an aspheric reflecting surface for correcting spherical aberration.

A geometric construction as shown sectionally in FIG. 1 is helpful in visualizing the shape of an aspheric mirror which will correct spherical abberation introduced by a spherical mirror. A spherical mirror 10 has a center of curvature 11, and a spherical focal curve 12 concentric with mirror 10 with a radius equal to one-half the radius of the spherical mirror. A point light source 14, positioned on the mirror axis at focal curve 12, emits light rays 15a, 15b, 15c, etc. The light rays are reflected by the spherical mirror at an angle of reflection equal to the angle of the ray in accordance with the law of reflection.

The path of the reflected rays is easily determined by constructing a family of circles around center of curvature 11 and having radiuses such that the projection of each incident ray is tangent to a circle. The reflected ray is then drawn to be tangent to the same circle, whereby a line from the center of curvature to the point of incidence on the mirror bisects the angle between the incident and reflected rays.

For example, a circle 17 has a radius such that a projection of ray 15d is tangent to the circle. Reflected ray 15d is then drawn from the point of incidence on the spherical mirror to be tangent to circle 17. A line 18 from center of curvature 11 to the point of incidence of ray 15d on the spherical mirror is seen to bisect the angle between the incident and reflected ray in accordance with the law of reflection. Circles used to construct the other reflected rays in FIG. 1 are omitted for clarity of illustration.

While reflected axial ray 15h and reflected paraxial rays 15f and 15g are seen to be substantially parallel, the well-known effect of spherical aberration causes reflected marginal or rim rays such as rays 15a–e to become increasingly convergent toward the mirror axis. The objective of this construction is to determine the shape of a correcting mirror 20 which will return these rays to the spherical mirror and then to a perfect focus at source 14, eliminating the effects of spherical aberration.

A condition of the construction is that all the rays 15 will traverse the same distance over their total paths, and it is desirable to position the center of correcting mirror 20 at center of curvature 11. These conditions are implemented by constructing a circle 21 having its center at source 14 and having a radius equal to three times the focal length of the spherical mirror. Rays 15 are then projected outwardly to intersect circle 21 such that all the projected rays are of equal length. The length thus determined is plotted on the reflected rays, and this construction is illustrated on ray 15d by swinging the projected ray around the point of incidence on the spherical mirror to overlay the reflected ray 15d.

It is clear that a small plane mirror can be positioned normally to each reflected beam to reflect that beam back to source 14. This is illustrated by a series of small plane mirrors 20a, 20b, 20c, etc., positioned perpendicularly to and at the end of each reflected light beam 15.

The small mirrors are then smoothly connected to define the surface curvature of correcting mirror 20.

The correcting mirror is seen to have a surface which has zero curvature at its center, is nearly flat in its generally central zone, and becomes increasingly curved and swept back with increasing distance from its center. It is known in the art that this surface is closely approximated by a fourth-degree rotation paraboloid. Thus, an aspheric correcting mirror of this curvature and positioned at the center of curvature of a spherical mirror will cancel spherical aberration introduced by spherical mirror 10 and return light rays 15 to a perfect focus at source 14. While this type of aspheric correcting mirror has great utility in many types of optical instruments, its use to date has been sharply limited due to the great cost of hand figuring the required aspheric surface. This invention overcomes the limitations inherent in time consuming and costly hand figuring, and permits quick and economical generation of many types of aspheric reflecting surfaces.

FIG. 1A is a further illustration of the geometry of the upper portion of the optical components shown in FIG. 1, and shows the path of single light ray 15d originating at point source 14 positioned on principal axis 22 of the spherical mirror midway between the spherical mirror and the correcting mirror. Ray 15d is incident on spherical mirror 10 at a point 23, and is incident on correcting mirror 20 at a point 24. The symbols used in this diagram are defined as follows:

$\alpha$ = the angle between principal axis 22 and ray 15d $\beta$ = the angle between the principal axis 22 and a line connecting center of curvature 11 and point 23 of the spherical mirror $\gamma$ = the angle between a line connecting center of curvature 11 and point 23 and the incident and reflected light rays 15d respectively $\delta$ = the angle between reflected ray 15d and a line parallel to principal axis 22 and passing through point 23, and is a measure of the spherical aberration of the spherical mirror $a$ = the length of ray 15d between source 14 to point 23

$b$ = the lateral spacing of point 23 from principal axis 22

$c$ = the axial spacing of point 23 from the center of spherical mirror 10

$d$ = the length of ray 15d between point 23 and point 24

$f$ = the focal length of spherical mirror 10

$R$ = the radius of curvature of spherical mirror 10 (equal to $2f$)

$x$ = the lateral spacing of point 24 from principal axis 22

$y$ = the axial spacing of point 24 from a line perpendicular to principal axis 22 and passing through center of curvature 11, the line being the central tangent of the surface of the correcting mirror The functional relationship of $y$ and $x$ determine the aspheric curvature of correcting mirror 20. As a starting point, the desired numeric aperture (sin $\alpha$) of the spherical mirror is determined, and the following relations can be derived from the geometry shown in FIG. 1A:

(1) $$\sin \alpha = 2 \sin \gamma$$

(2) $$\alpha = \beta + \gamma = \delta + 2\gamma$$

(3) $$a = 2f \frac{\sin \beta}{\sin \alpha}$$

(4) $$b = 2f \sin \beta$$

(5) $$c = 4f \sin^2 \frac{\beta}{2}$$

(6) $$d = 3f - a$$

(7) $$x = 2f \sin \beta - \left[ 3f - 2f \frac{\sin \beta}{\sin \alpha} \right] \sin \delta$$

(8) $$y = \left[ 3f - 2f \frac{\sin \beta}{\sin \alpha} \right] \cos \delta + 4f \sin^2 \frac{\beta}{2} - 2f$$

The following table shows values for $x$ and $y$ in terms of spherical-mirror focal length $f$ for two specific numeric apertures (N.A.):

| Quantity: | N.A.[1] 0.50000 relative aperture $f/1.0$ | N.A.[1] 0.33333 relative aperture $f/1.5$ |
|---|---|---|
| Sin $\alpha$ | 0.50000 | 0.33333 |
| $\alpha$ | 30°00.00′ | 19°28.26′ |
| $\delta$ | 1°02.72′ | 0°16.98′ |
| $x(f)$ | 0.50004 | 0.33333 |
| $y(f)$ | 0.00214 | 0.00044 |

[1] At focus.

These values are in close agreement with the corresponding points on a correcting mirror having a surface defining a fourth-degree rotation paraboloid, and illustrate the sharp increase in correcting-mirror curvature as larger apertures are employed.

Figure 2:
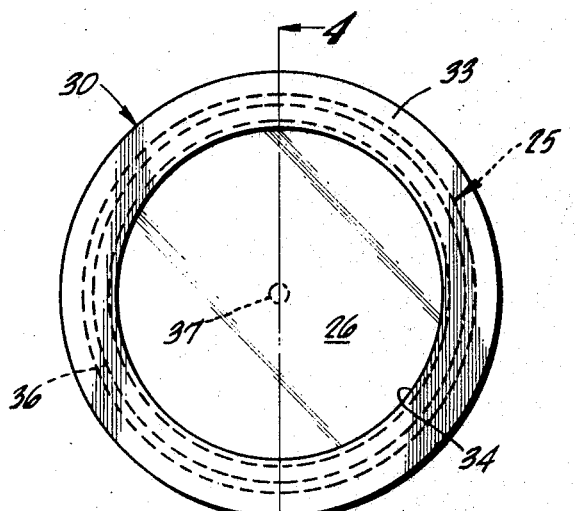
FIG. 2 is a front elevation of a pressurized aspheric-mirror assembly in accordance with the invention.
Figure 3:
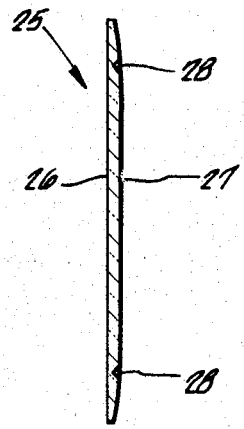
FIG. 3 is a cross-sectional side view of an undeflected mirror member.
Figure 4:
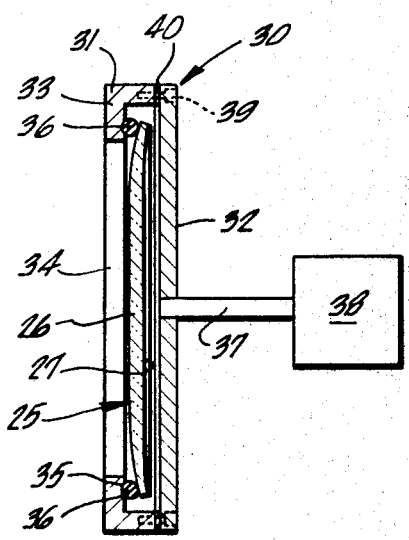
FIG. 4 is a view along line 4—4 of FIG. 2.

Referring to FIGS. 2–4, a flexible member 25 is generally circular in plan view, and has a flat, front reflecting surface 26 and a rear surface 27. Member 25 may be a thin sheet of optical glass, or another flexible material such as metal, and reflecting surface 26 is formed by any conventional method such as vacuum deposition of an aluminum coating. The member should be as thin as possible, consistent with strength and homogeneity, and preferably has a diameter-to-thickness ratio of about 50–1.

The thickness of member 25 is reduced toward its periphery by coarse grinding the outer portion of rear surface 27 as shown in FIG. 3. This radial thickness reduction is started at one-half to two-thirds the radius of the disc and tapers smoothly toward the edge of the disc to produce an edge thickness about one-half the center thickness of member 25. The purpose of the thickness gradation is to bend the edge of the deflected disc backward, contrary to the direction which the fourth-degree component would take in an initially plane-parallel disc due to the influence of the tangential stress pattern in the deflected member. The exact type of taper required for a specific shape of member is determined by progressive figuring of the taper with repeated Foucault testing as the figuring is carried out.

A housing 30 includes a short, generally circular tube 31 having a base 32 secured across one of its ends. An annular mounting flange 33 is secured at the other end of the tube and extends toward the center of tube to define a circular opening 34. An annular groove 35 is cut in the inner face of flange 33, and a seal 36 such as an O-ring is seated in the groove. A hollow line 37 is secured to and extends through base 32 of the housing, and line 37 is connected to a pressure source 38. Although the housing can be fabricated in many different ways, FIG. 4 illustrates a form in which tube 31 and flange 33 are integral, and base 32 is secured to the tube by screws 39, an annular gasket 40 being positioned between the base and tube to insure a leak-tight seal.

Flexible member 25 is positioned inside the housing as shown in FIG. 4 with front reflecting surface 26 facing opening 34 and the radially outer portion of the reflecting surface resting against seal 36. Air, or any other convenient gaseous or liquid medium, is then introduced under pressure from source 38 through line 37 to force member 25 against seal 36, forming a closed chamber inside the housing. Member 25 deflects outwardly under the uniform loading imposed by the pressurized medium in this closed chamber, and front reflecting surface 26 is thereby deformed into a predictable, repeatable aspheric shape. The same result may of course be obtained by venting hollow line 37 to atmospheric pressure, and evacuating the space around housing 30. In either case, a differential pressure is created across the faces of member 25, and the member deflects outwardly to deform the front reflecting surface.

It is known from the theory of elasticity that a flexible disc which is uniformly loaded and uniformly supported about its periphery will deflect to generate a surface which is a second-plus fourth-degree rotation curve, the fourth-degree component of which is reversed in sign by introducing the taper toward the edge of the member. The second-degree component introduces a small negative optical power which can be cancelled by slightly increasing the radius of curvature of the mirror above the theoretical value of $2f$, maintaining the same center of curvature. The accuracy with which the desired curvature has been achieved can be easily checked by a Foucault test or other conventional optical testing technique.

It has been found that any errors noted in the testing process can be easily corrected by grinding a relatively coarse correction such as cuts 28 in rear surface 27 of the flexible member. Such coarse correcting cuts in the rear surface cause a very fine, smoothly modulated correction in the curvature of the front surface when the member is pressurized. That is, relatively coarse "retouches" on the rear surface cause very gentle changes in curvature of the front surface, and the retouching process is carried out until a desired degree of curvature precision has been achieved on the front surface. With the proper arrangement of pressurizing apparatus, this process can be carried out while the mirror is pressurized, and progress checked by repeated Foucault tests or similar procedures.

The member is of course always pressurized when in use as an aspheric mirror, and can be permanently connected to a regulated source of pressure, or can be pressurized to a desired degree and then valved off from the pressure source. Assuming that normal precautions in constructing the housing have been observed, the desired pressure should be maintained in the housing for a long period before molecular leakage through the several seals makes repressurization necessary.

Figure 6:
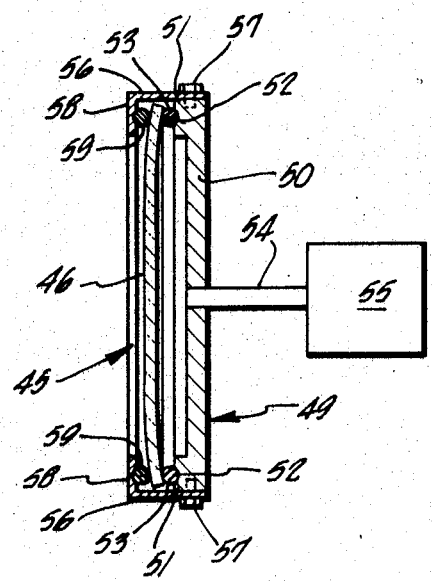
FIG. 6 is a side elevation, partly in section, of an evacuated aspheric-mirror assembly.
Figure 5:
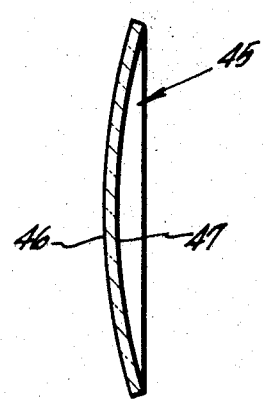
FIG. 5 is a cross-sectional side view of an undeflected convexo-concave mirror member.

An alternative form of the invention is shown in FIGS. 5 and 6, in which a flexible member 45 has front reflecting surface 46 and a rear surface 47. Surfaces 46 and 47 have a spherical curvature when the member is unstressed, and both surfaces have the same center of curvature whereby they are portions of concentric spheres. A housing 49 for flexible member 45 includes a base 50 and an annular boss 51 extending from the periphery of the base. An outer face of the boss defines an annular groove 52, and an annular seal 53 such as an O-ring is seated in the groove. A hollow line 54 is secured to and extends through the base of the housing, and the line is connected to a vacuum source 55 such as a conventional vacuum pump and pressure regulator.

As shown in FIG. 6, flexible member 45 is positioned against seal 53, and the closed chamber thus formed between the housing and the flexible member is evacuated through line 54 by source 55. Alternatively, line 54 may be vented to atmosphere, and the region surrounding the housing and member may be pressurized to produce a differential pressure between the faces of the member which tends to deflect the member toward the base of the housing.

An annular retaining bracket 56 is secured to the periphery of boss 51 by screws 57, and includes an inwardly extending lip 58 (which may be dimensioned to serve as an aperture stop) positioned in front of the front reflecting surface of flexible member 45. A resilient seal or annular pad 59 such as an O-ring is seated in a groove in lip 58, and presses lightly against front reflecting surface 46 to hold the flexible member in position when no differential pressure exists between the front and rear surfaces of the member. This arrangement also assures proper seating of the flexible member against seal 53 so a leak-free seal will be formed when the chamber between the housing and flexible member is evacuated.

Again, it is known from the theory of elasticity that spherically curved member 45 will deflect under uniform loading and uniform support about its periphery to generate a second- plus fourth-degree rotation curve, the fourth-degree component of which serves directly to correct spherical aberration without need for tapering the edge of the initially concentric shell. Also in this case, contrary to the first described arrangement, the second-degree component can be completely suppressed by the right amount of pressure difference, thus making the vertex radius of curvature of the correcting member exactly infinite, and obviating the need for modifying the mirror curvature. In this case, the concentric spherical shell can be pressure deflected to an excellent approximation of the ideal fourth-degree rotation paraboloid. Residual deviations can be quickly recognized by a Foucault test, and corrected by a relatively coarse figuring of the back of the reflecting element.

The form of the invention shown in FIGS. 5 and 6 is preferred for applications where only one or a few correcting mirrors are required as the spherical, convexoconcave unstressed curvature of flexible member 45 is relatively easy to form using known grinding techniques. Where a large number of correcting mirrors are to be manufactured on a production-line basis, tapering-cross-section flexible member 25 is preferred as it can be economically produced on automatic profile-grinding equipment once the desired taper is established for the specific shape of member being used. In either case, any necessary fine corrections revealed by Foucault testing can be quickly and easily introduced by coarse-ground cuts on the rear surface of the member.

The application of the invention in a grating spectrograph 60 is shown in FIGS. 7–9. The spectrograph includes a case 61 having an entrance window 62, and preferably the case is airtight so it can be evacuated by a vacuum pump (not shown) for deep-ultraviolet spectrographic analysis. Alternatively, the case can be purged and filled with a gas such as dry nitrogen or helium which is free of oxygen and water vapor to permit deep-ultraviolet work. A concave spherical mirror 64 is positioned in a conventional mirror mounting 65, and the mirror mounting is secured at one end of case 61 as shown in FIG. 7.

A focal-curve support 67 is secured to the case, and includes a film holder 68 arranged to position a photographic film strip 69 at the focal curve of spherical mirror 64. The film strip is secured in place by a conventional film clip 70 as seen in FIG. 9. A member 72 defining an entrance slit 73 is secured to focal-curve support 67 and is positioned so the entrance slit is illuminated by radiation passing into the instrument through window 62. A small plane mirror 74, positioned in a mounting 75 secured to the focal-curve support, receives radiation from the entrance slit and redirects this radiation to spherical mirror 64. These components are all of conventional design, and need not be described in detail.

An aspheric reflecting diffraction-grating assembly 78 is secured to case 61, and positions a flexible member 79 opposite spherical mirror 64, the center of the member being located at the center of curvature of the spherical mirror. Assembly 78 includes a housing 80 which may be identical to housing 30 described above and illustrated in FIGS. 2–4. An annular field-limiting aperture-stop plate 81 is secured to the housing in front of member 79. A hollow line 82 is connected to a pressure source 83, and extends through case 61 and housing 80 whereby the interior of the housing can be pressurized in the manner already described.

Flexible member 79 is generally similar in shape and construction to flexible member 25 described above, and includes a front reflecting surface 85, and a rear surface 86. However, member 79 has a diffraction grating 87 ruled on front reflecting surface 85. Thus, when assembly 78 is pressurized in the manner already described to deflect front reflecting surface 85 into an aspheric curvature, member 79 serves as both a reflecting diffraction grating to disperse and reflect incident radiation, and a correcting mirror to cancel spherical aberration introduced by spherical mirror 64.

As an initial step in the operation of spectrograph 60, assembly 78 is pressurized by pressure source 83 through line 82 to deflect flexible member 79 into the desired fourth-degree rotation paraboloid as already described. If the interior of case 61 is evacuated to permit spectrographic analysis in the deep-ultraviolet range, the pressure from source 83 is correspondingly adjusted to provide the desired differential pressure across flexible member 79. Radiation from a light source (not shown) to be analyzed is focused through windows 62 on entrance slit 73. The incoming radiation is schematically represented in FIG. 7 by rays 88, 89 and 90.

Radiation from the slit is redirected by plane mirror 74 to concave spherical mirror 64 which reflects almost-parallel rays 88a, 89a and 90a to the diffraction grating. These rays would be parallel but for the effects of spherical aberration as already described and illustrated in FIG. 1. The reflecting grating disperses the incident radiation into its spectral components, and reflects the radiation back to spherical mirror 64.

For example, rays 88, 89 and 90 are respectively dispersed into rays 88b, 89b and 90b of one frequency, and rays 88c, 89c and 90c of a second frequency. The dispersed rays are redirected to spherical mirror 64 and brought to a focus on film strip 69 where they are recorded. The spherical-aberration correction introduced by flexible member 79 permits all rays of a common wavelength to be brought to a perfect focus on the film strip.

That is, rays 88b, 89b and 90b are focused into a single spectral line 91, and rays 88c, 89c and 90c are focused to a second spectral line 92 on the film strip. Spherical aberration introduced by spherical mirror 64 is offset and cancelled by the aspheric reflecting surface on flexible member 79. The spectrograph assembly shown in FIGS. 7–9 is of course not limited to the illustrated form of a pressurized reflecting diffraction-grating assembly, and for example the assembly shown in FIGS. 5–6 is equally usable in such a spectrograph.

Spectrograph 60 has utility in a broad range of applications such as astronomic spectrography, plasma physics, and spectro-chemical analysis. The entire wavelength range from infrared to vacuum ultraviolet can be analyzed, and the unit can be fabricated at relatively low cost due to the unique method of generating the aspheric reflecting diffraction grating.

It is to be recognized that the apparatus and method of the invention represent an entirely different approach than the technique of grinding aspheric refracting plates while the plate is deformed under pressure. This technique was used by Bernard Schmidt many years ago (see, for example, pages 118–23 of Scientific American, August 1939, and pages 713–15 of Applied Optics, volume 5, No. 5, May 1966) and can be viewed as a manufacturing step in the production of refractors. This invention, on the other hand, relates to mirrors which are pressurized or otherwise forcibly deflected while in use for their intended ultimate purpose.

There has been described a novel method and apparatus for generating aspheric reflecting surfaces. The particular configurations of the invention described above are illustrative of many possible forms, and it is to be understood that the invention is not limited to the illustrated designs. For example, the invention extends to a reflecting surface on a flexible member which is point loaded or non-uniformly loaded to produce a specific desired deflection curve. Uniform loading produced by creating a differential pressure across the faces of the flexible member is preferred, however, as this kind of loading is simple to generate and control, and produces a good approximation of a surface suitable for correction of spherical aberration.

What is claimed is:
1. In an optical instrument in which an aspheric mirror is useful to correct spherical aberration, the instrument having a target surface and being arranged to receive light from a light source, the improvement comprising:
a flexible and self-supporting non-membranous member being free of radial tension forces and edge constraints, and having a spherical reflecting surface when the member is unstressed;

mounting means secured to the instrument for supporting the member whereby a portion of the member can be deflected generally perpendicularly to the reflecting surface, and being free of structure impeding edgewise movement of the member, the mounting means positioning the reflecting surface to receive light from the light source and to reflect the light toward the target surface; and deflecting means for applying and maintaining a force on the member to deflect the initially spherical reflecting surface into an aspheric reflecting surface shaped substantially as a fourth-degree rotation paraboloid with an infinite vertex radius of curvature to correct spherical aberration of the light.

2. The improvement defined in claim 1 in which the deflecting means includes means for maintaining a differential pressure across the member whereby the deflected portion of the member is substantially uniformly loaded.

3. The improvement defined in claim 1 in which the mounting means comprises a housing having an aperture, and a seal disposed on the housing around the aperture, the flexible member being positioned against the seal to form an enclosure within the housing.

4. The improvement defined in claim 3 in which the deflecting means comprises means for maintaining a differential pressure between the enclosure and a space outside the housing and flexible member whereby the member is uniformly loaded.

5. The improvement defined in claim 4 in which the differential-pressure means comprises a source of a pressure medium, and a line connected to the source and connected to the housing in communication with the enclosure.

6. The improvement defined in claim 5 in which the seal comprises an O-ring.

7. The improvement defined in claim 5 in which the flexible member is generally circular, and has a flat front reflecting surface and a rear surface which tapers toward the front surface to form an outer cross section which decreases in thickness with increasing distance from the center of the member.

8. The improvement defined in claim 4 in which the flexible member is spherically convexo-concave, the front surface being convex, and the differential-pressure means comprises a vacuum source connected to the housing in communication with the enclosure.

9. An aspheric reflecting diffraction grating adapted for correction of spherical aberration, comprising:

a flexible and self-supporting non-membranous member being free of radial tension forces and edge constraints, and having a spherical reflecting surface when the member is unstressed, the surface having a diffraction grating ruled therein;

mounting means for supporting the member whereby a portion of the member can be deflected generally perpendicularly to the reflecting surface, and being free of structure impeding edgewise movement of the member; and deflecting means for applying and maintaining a force on the member to deflect the initially spherical reflecting surface into an aspheric reflecting surface shaped substantially as a fourth-degree rotation paraboloid with an infinite vertex radius of curvature to correct spherical aberration of light impinging on the reflecting surface.

10. The diffraction grating defined in claim 9 in which the flexible member is circular and has a flat front reflecting surface when the member is unstressed, and a rear surface which tapers toward the front surface to form an outer cross section which decreases in thickness with increasing distance from the center of the member; the mounting means being arranged to support the member uniformly about the periphery of the member, and to seal the front surface from the back surface; and the deflecting means includes means for applying and maintaining a differential pressure across the member whereby the front surface is exposed to a first pressure lower than a second pressure to which the rear surface is exposed.

11. The diffraction grating defined in claim 9 in which the flexible member is concentrically spherically concavo-convex, the spherical reflecting surface being convex, and in which the deflecting means includes means for applying and maintaining a differential pressure across the member whereby the convex surface is exposed to a first pressure higher than a second pressure to which the concave surface of the member is exposed.

12. A spectograph, comprising:

a spherical mirror arranged to receive radiant energy to be analyzed, the mirror having a center of curvature and a focal curve;

a flexible and self-supporting non-membranous member being free of radial tension forces and edge constraints, the member being disposed at the center of curvature of the mirror and having a spherical reflecting surface when the member is unstressed, the surface having a diffraction grating ruled thereon and being oriented to receive reflected radiant energy from the spherical mirror and to re-direct dispersed radiant energy back to the spherical mirror;

means for supporting the periphery of the member whereby the surface having the diffraction grating is deflectable generally perpendicular to the reflecting surface, the supporting means being free of structure impeding edgewise movement of the member;

means for applying a differential pressure across the member to deflect the initially spherical reflecting surface into an aspheric reflecting surface shaped substantially as a fourth-degree rotation paraboloid with an infinitive vertex radius of curvature to correct spherical aberration of radiant energy received from the spherical mirror; and means positioned at the focal curve of the spherical mirror to receive dispersed radiant energy reflected by the spherical mirror.

References Cited

UNITED STATES PATENTS

| 3,031,928 | 5/1962 | Kopito | 350—295 |
| 3,343,448 | 9/1967 | Baird | 350—295 X |

FOREIGN PATENTS

| 380,473 | 9/1932 | Great Britain. |
| 400,445 | 10/1933 | Great Britain. |

JOHN K. CORBIN, Primary Examiner

U.S. Cl. X.R.

350—200, 295

UNITED STATES PATENT OFFICE
CERTIFICATE OF CORRECTION

Patent No. 3,521,943                            July 28, 1970

Herman F. Kelderman

It is certified that error appears in the above identified patent and that said Letters Patent are hereby corrected as shown below:

Column 3, line 29, after "to the angle" insert -- of incidence --. Column 5, line 45, after "of" insert -- the --.

Signed and sealed this 27th day of October 1970.

(SEAL)
Attest:

Edward M. Fletcher, Jr.                       WILLIAM E. SCHUYLER, JR.
Attesting Officer                                  Commissioner of Patents

UNITED STATES PATENT OFFICE
CERTIFICATE OF CORRECTION

Patent No. 3,521,943      Dated July 28, 1970

Inventor(s) Herman F. Kelderman

It is certified that error appears in the above-identified patent and that said Letters Patent are hereby corrected as shown below:

Column 3, line 29, after "to the angle" insert -- of incidence --. Column 5, line 8, "x(f)....0.50004    0.33333" should read -- x....0.50004f    0.33333f --; line 9, "y(f)....0.00214    0.00044" should read -- y....0.00214f    0.00044f --; line 45, after "of" insert -- the --.

This certificate supersedes Certificate of Correction issued October 27, 1970.

Signed and sealed this 23rd day of February 1971.

(SEAL)
Attest:

EDWARD M. FLETCHER, JR.       WILLIAM E. SCHUYLER, JR.
Attesting Officer      Commissioner of Patents